Oct. 21, 1924. 1,512,352
N. MALLARDI
RECEPTACLE FOR BARBERS' IMPLEMENTS AND THE LIKE
Filed March 23, 1923
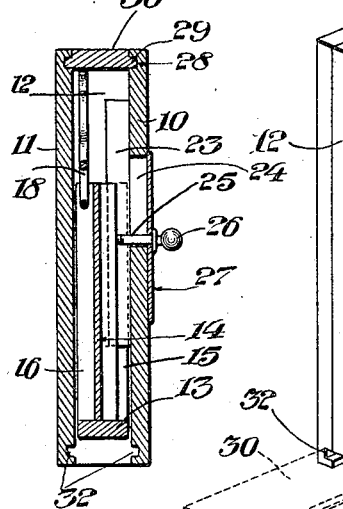
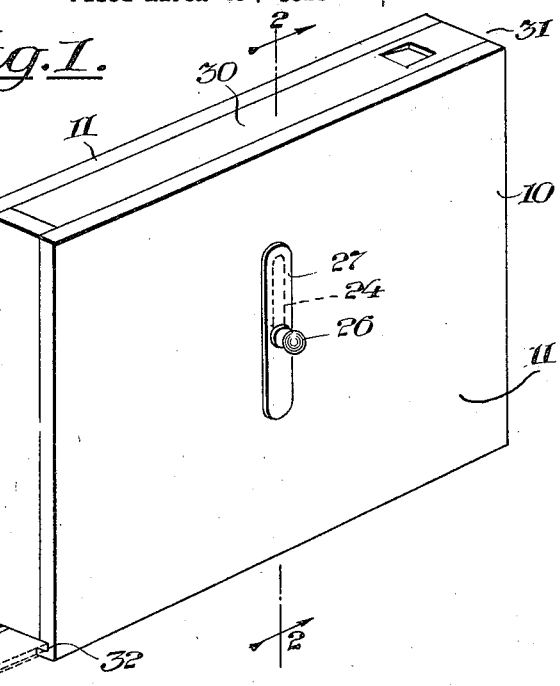
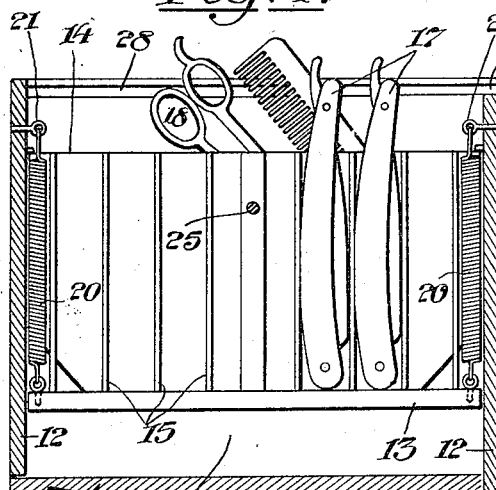
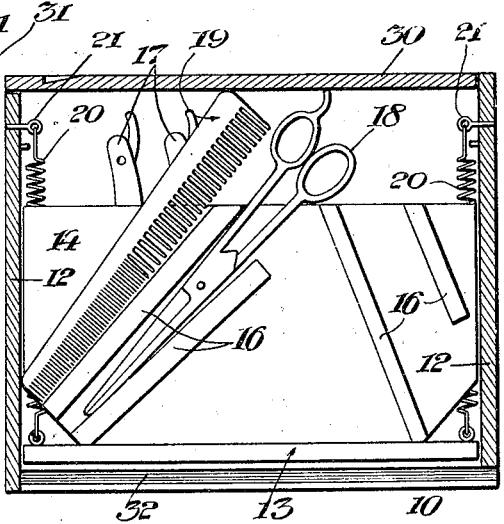
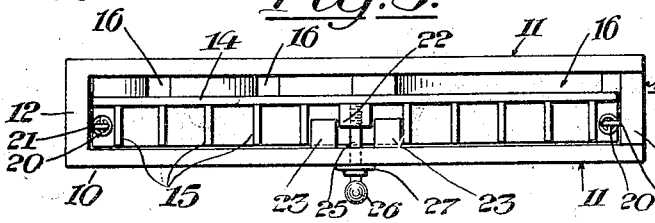
Inventor
Nick Mallardi
by his Attorney
John R. Nolan Patented Oct. 21, 1924.

1,512,352

UNITED STATES PATENT OFFICE.

NICK MALLARDI, OF BROOKLYN, NEW YORK.

RECEPTACLE FOR BARBERS' IMPLEMENTS AND THE LIKE.

Application filed March 23, 1923. Serial No. 627,013.

*To all whom it may concern:*

Be it known that I, NICK MALLARDI, a citizen of the United States, and resident of the city of New York, borough of Brooklyn, in the county of Kings and State of New York, have invented certain new and useful Improvements in Receptacles for Barbers' Implements and the like, of which the following is a specification.

This invention relates to a receptacle for elongated implements, such, for example, as barbers' razors, combs and scissors; the object of the invention being to provide a neat and attractive receptacle of such construction that it occupies comparatively small space and yet efficiently supports a multiplicity of implements in convenient position for their individual removal and replacement as occasion may require, which receptacle also provides a neat and compact protective container and carrier for the implements when they are not in use.

The preferred form of embodiment of my invention herein illustrated comprises a relatively narrow, long and deep rectangular case, open at top and bottom; a vertically-movable holder mounted within the case and having a series of compartments constructed and arranged to support the implements separately and in upright position with their upper ends projecting above the holder; retracting springs connecting the holder with the end walls of the case in such a manner as to maintain said holder normally in raised position with the upper ends of the implements protruding above the open top of the case; an exterior knob whereby the holder can be manually depressed against the action of the springs to lower the contents of the holder into the case and below the open top, and a removable cover which is slidable upon the top of the case in a manner to maintain the holder and its contents confined within the case, or which cover, when removed from the top to expose the implements, is slidably applied to the bottom of the case so as to be conveniently and safely located.

The invention also comprises novel features of construction and combinations of parts which will be hereinafter described and claimed.

In the drawings—

Figure 1 is a perspective view of a receptacle embodying my invention, showing the cover as applied to the open top of the case, and indicating in dotted lines the mode of applying the cover to the open bottom of the case.

Fig. 2 is a transverse vertical section through the receptacle, on the line 2—2 of Fig. 1.

Fig. 3 is a longitudinal vertical section through the closed receptacle, showing various implements therein.

Fig. 4 is a similar view illustrating the encased implement holder in the position that it occupies when the cover is removed, said cover being shown as applied to the bottom of the case.

Fig. 5 is a plan of the open receptacle.

Referring to the drawings, 10 designates a relatively narrow, long and deep rectangular receptacle, open at top and bottom, and comprising sides 11, and ends 12. Within this receptacle is a vertically-movable holder for supporting the closed razors, or other elongated implements, in spaced-relation to each other and in upright position. This holder, in its preferred construction, comprises a bottom 13 proportioned to fit slidably within the casing, and a vertical partition 14 extending from end to end of the case. This partition is provided on one side thereof with spaced-apart vertical strips 15 which afford a series of vertical compartments, and on the other side with suitably spaced inclined strips 16 which afford a series of diagonal or tapering compartments. The vertical compartments are designed to receive implements, such as closed razors 17, and the diagonal compartments are designed to receive implements such as the scissors 18 and comb 19; the upper ends of all the implements, when thus supported in the compartments, extending a substantial distance above the top of the holder.

The respective ends of the bottom 13 are connected by means of retracting springs 20 with eyes 21 on the adjacent ends 12 of the case in such a manner that the springs tend to maintain the holder normally raised with the upper ends of the implements protruding above the open top of the case, as seen in Fig. 4. Thus any of the implements can be readily selected from the others and withdrawn from the holder, or can be as readily replaced therein, as occasion may require.

The partition 14 is provided on one side with a median guide strip 22 which is slidable between a pair of parallel guide-strips 23 on the adjacent side wall of the case. This wall has formed therein a vertical slot 24 through which extends from the guide strip 22 a stud 25 having a suitable knob 26 by the manipulation of which the slidable holder can be readily depressed in opposition to the force of the springs, so as to retract the upper ends of the implements below the top of the case. The stud is preferably provided with a cap plate 27 which covers and conceals the slot.

The side walls of the case are provided adjacent their upper edges with parallel grooves 28 adapted to receive the complementary ribs 29 of a suitable slide cover 30, one of the end walls of the case being reduced, as at 31, to permit the entry of the cover ribs into the grooves. Hence when the holder and its contents are depressed as just mentioned, the cover can be efficiently applied to the open top of the case in a manner to confine the holder and its contents within the case, the tops of the implements thus being held firmly against the opposing cover by the stress of the springs. When the holder is thus depressed its bottom portion 13 constitutes a bottom for the case.

The side walls of the case are provided adjacent their lower edges with parallel grooves 32 similar to the grooves 28; and hence when the cover is removed from the top of the case, such cover can be readily applied to the bottom of the case, (as in Fig. 4) in convenient position for subsequent removal and application to the top of the case, when needed.

It is to be understood that I do not limit my invention to the specific details of construction herein disclosed, as the same may be modified within the principle of my invention and the scope of the appended claims.

I claim—

1. In a receptacle of the kind described, the combination with a case having an open top, of a vertically-movable holder within and of less depth than the said case and comprising a series of compartments within which the implements are adapted to be separately supported in position with their upper ends projecting above the holder, resilient means for maintaining said holder normally in raised position with the upper ends of the implements protruding above the open top of the case, means for manually depressing said holder to lower its contents into the case, said means being connected with the holder and extended exteriorly of a wall of the case, and a removable cover adapted when applied to the case, to bear upon the implements and thus maintain the holder and its contents confined within the case.

2. In a receptacle of the kind described, the combination with a case open at top and bottom, of a vertically-movable holder within and of less depth than the case and comprising a series of compartments and a bottom portion, said compartments being constructed to support the implements separately and in position with their upper ends projecting above the holder, resilient means for maintaining said holder normally in raised position with the upper ends of the implements protruding above the open top of the case, means for manually depressing said holder to lower its contents into the case, and a removable cover slidable upon the top and the bottom of the case, said cover when applied to the top maintaining the holder and its contents confined within the case.

3. In a receptacle of the kind described, the combination with a case open at top and bottom, of a vertically-movable holder within and of less depth than the case and comprising a vertical partition wall extending from end to end of the case, spacing pieces on the respective sides of said wall providing compartments, and a bottom portion for said wall and spacing pieces, said compartments being constructed to support the implements separately and in position with their upper ends projecting above the holder, retracting springs at the respective ends of the holder for maintaining the latter normally in raised position, means for manually depressing said holder to lower its contents into the case, and a removable cover slidable upon the top and the bottom of the case, said cover when applied to the top maintaining the holder and its contents confined within the case.

Signed at New York in the county and State of New York this 21st day of March A. D. 1923.

NICK MALLARDI.